April 30, 1929.	C. C. SPREEN	1,711,254

REFRIGERATION

Filed Jan. 10, 1927

Charles C. Spreen
Inventor by Smith and Freeman
Attorneys

Patented Apr. 30, 1929.

1,711,254

UNITED STATES PATENT OFFICE.

CHARLES C. SPREEN, OF DETROIT, MICHIGAN, ASSIGNOR TO KELVINATOR CORPORATION, OF DETROIT, MICHIGAN, A CORPORATION OF MICHIGAN.

REFRIGERATION.

Application filed January 10, 1927. Serial No. 160,296.

My invention relates to refrigeration, and particularly to a combined fan and pulley designed to be used to operate and cool the compressor of a mechanical refrigeration apparatus, and the principal object of my invention is to produce a new and improved device of this type. In the drawings accompanying this specification and forming a part of this application I have shown, for purposes of illustration, several forms which my invention may assume, and in these drawings:

Figure 2 is a section on the line 2—2 of Figure 1, while

Figure 1:
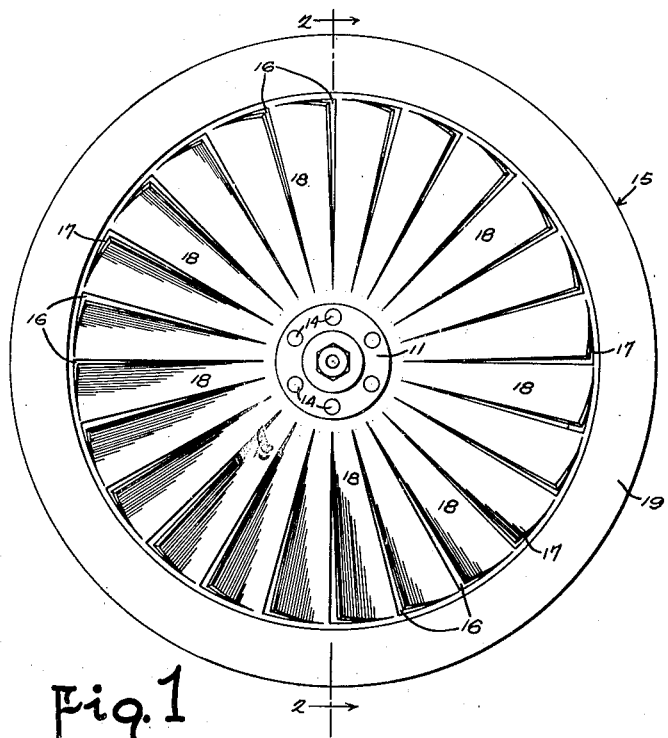
Figure 1 is an elevation of the embodiment of my invention herein disclosed.
Figure 2:
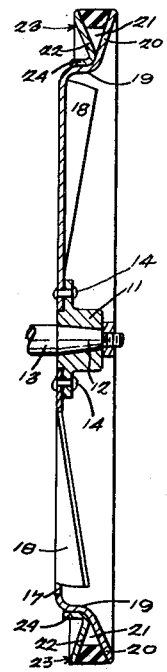

The embodiment of my invention as shown in Figures 1 and 2 comprises a hub 11 adapted to be mounted on a spindle 12 on the end of a compressor drive shaft 13. Attached to the hub 11 by rivets 14, or like means, is a disc 15 having slits 16 extending from points adjacent to the hub radially outward and other slits 17 concentric with the hub 11 partially severing the material of the disc 15 between the outer ends of adjacent radial slits 16 whereby, when those portions of the disc 15 which are defined by the slits 16 and 17 are bent away from the plane of the disc, fan blades 18 will be formed.

The disc 15 also has its periphery offset from the plane of the disc to form a flange 19 having an extension 20 deflected to form one of the side walls of a V-shaped belt groove 21 the other side of which is formed by the deflected skirt 22 of an annular member 23 having an inner flange 24 welded to the flange 19 of the disc 15.

Figure 5:
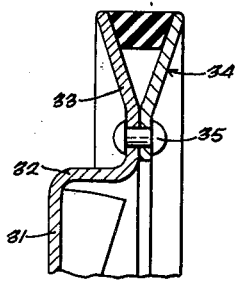
Figures 3, 4 and 5 are fragmentary views showing variations possible with the embodiment of my invention herein shown.
Figure 3:
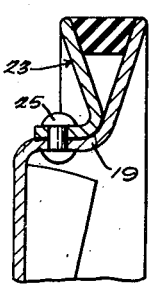
Figure 4:
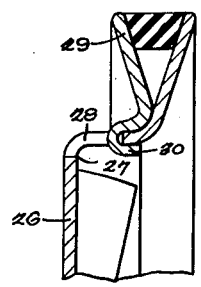

In the variation of my invention shown in Figure 3 the annular member 23 is secured to the flange 19 by a series of rivets 25; in the variation of my invention shown in Figure 4 the disc 26 is provided in its flange 27 with slots 28, and the annular member 29 is secured in position by means of lugs 30 extending through the slots 28 and clamped to the flange 27; and in the embodiment of my invention shown in Figure 5 the disc 31 is provided with a flange 32 from which extends a deflected portion 33 deflected oppositely from the deflected portion 20 of the disc 15 shown in Figures 1 and 2 to thus form the opposite side of the belt groove, and the annular member 34 is oppositely deflected, and is secured to the opposite side of the disc 31 by means of a series of rivets 35.

From the above disclosure it will be obvious to those skilled in the art that I have provided a new and improved combined fan and pulley which accomplishes the principal object of my invention.

It will also be obvious to those skilled in the art that the particular embodiment of my invention herein shown and described may be variously changed and modified without departing from the spirit of my invention or sacrificing the advantages thereof, and it therefore will be understood that the disclosure herein is illustrative only, and that my invention is not limited thereto.

I claim:

A unitary fan and belt pulley structure comprising a hub, a disk secured to said hub, said disc having a peripheral offset portion provided with slots and terminating in a peripheral flange extending in a plane substantially parallel to the plane of the main portion thereof, said disk having slits therein defining portions adapted to be bent outwardly to form substantially triangular fan blades, and a flanged annular member provided with lugs adapted to extend through the slots in the offset portion of said disk and be clamped thereto, the flanges of said disk and annular members being associated to form a belt groove.

In testimony whereof I hereunto affix my signature.

CHARLES C. SPREEN.